United States Patent Office 3,313,739
Patented Apr. 11, 1967

3,313,739
PROCESS FOR THE PREPARATION OF SILICA GEL
Ellsworth G. Acker, 3100 Rueckert Ave., Baltimore, Md. 21214, and Forrest R. Hurley, 9 Font Hill Drive, Ellicott City, Md. 21043
No Drawing. Filed Oct. 15, 1962, Ser. No. 230,726
5 Claims. (Cl. 252—451)

This invention relates to the preparation of an improved silica gel desiccant. In one specific aspect, it relates to a process for preparing silica gel having a higher adsorptive capacity than the standard gel.

The various methods of preparing silica gel are well known. Frequently, it is prepared by the reaction of a metal silicate (such as sodium) and a mineral acid. The reaction product is a sol which is allowed to set, then washed, dried, and activated to produce the desiccant.

It is also well known that by varying certain process conditions or by using special techniques, such as gas treatment, etc., gels with a wide range of physical properties can be prepared.

It is generally recognized in the field of silica gel manufacture that a method which produces even a slight change in a physical property is a significant advance in silica gel technology. The changes could make the product more effective in old uses or make it useful in new applications.

We have discovered a method for producing silica gel whereby its adsorptive capacity is increased significantly at low relative humidities. Gel with increased adsorption at low relative humidities is more efficient and effective in Freon drying, natural gas drying, dehumidification of air, etc.

Briefly, the process consists of preparing a silica sol, adding a metal salt to the sol, allowing the mixture to gel, then washing, drying and activating the gel.

The salts which we have found effective are those which hydrolyze easily to hydrous oxides. These salts generally have the metal or radical containing the metal in the +4 oxidation state. Specific examples include salts of titanium, germanium, zirconium, tin, hafnium, lead, thorium, cerium, and basic aluminum salts.

We have found that by adding 2–6% (based on the weight of $SiO_2$) of these salts to a silica sol, the product will have about 0.5 to 1% higher adsorptive capacity at 10% R.H. than a corresponding gel without the salt. This increased adsorptive capacity exists up to between 30 and 40% relative humidity. At the higher humidities, the effect is reversed and the gel is found to have lower adsorptive capacity than the corresponding gels without salt.

The higher water adsorption values at low relative humidities indicate that a larger number of small pores are formed than in the gel prepared by the prior art processes. This may be because the hydrous metal oxide partially coats the silica structure and its presence tends to reduce silica transfer which normally occurs during the washing and drying of silica gel. We do not wish to be limited by this explanation, however, since this is merely one possible theoretical explanation.

The process of our invention is carried out by first preparing a silica hydrosol. Any of the methods known in the art such as hydrolysis of $SiCl_4$, $SiF_4$, and ethyl ortho silicate can be used. However, we have prepared our sol by the reaction of sodium silicate and sulfuric acid. Other strong mineral acids, such as nitric, hydrochloric, etc. may be used. Sulfuric acid is considerably cheaper than the others and thus is the preferred reactant. The process could be carried out using any of the alkali metal silicates. However, sodium silicate is generally preferred because of its favorable economic position.

An organic metal silicate solution having a silica to alkali metal oxide ratio of about 3.25:1 is first provided. A sol is formed by pumping together 34% sulfuric acid at a rate of about 130 ml./min. and the silicate solution (containing 22.8% $SiO_2$ and 7% $Na_2O$) at a rate of about 240 ml./min. Agitation is used to blend these solutions. The pH of the sol prepared in this manner usually runs about 1.0. The temperature of the reaction mixture generally is about 35–40° C.

The next step in our process comprises adding 2–6% of the selected metal salt (based on the weight of silica in the hydrosol) to the sol with continued agitation. If the selected salt is a solid, the appropriate weight of the salt is dissolved in the minimum quantity of water which will completely dissolve the salt. If the salt is a liquid, it is added directly to the sol.

Any metal ion of the salt which will form a hydrous oxide when treated with large volumes of water may be used in the process of our invention. Examples of suitable salts include: the bromides, chlorides, iodides, sulfates and nitrates of cerium, germanium, lead, thorium, tin, titanium, and zirconium.

After the salt is thoroughly mixed with the hydrosol, the material is placed in an appropriate receptacle and allowed to gel. Set time for the gel used in the examples of this invention is generally 15 to 30 minutes. Gels prepared by other methods have varying set times. After gelling, it is generally allowed to age for several hours before continuing treatment.

The aged gel is then washed at a slightly elevated temperature (about 50–70° C.) with water whose pH is about 2.5–3.5. The pH can be adjusted with any suitable acid. The washing is continued until the resistivity (measured by a conductivity bridge) of the effluent equals that of the inlet wash water.

After washing is completed, the gel is dried by any of the conventional methods. We have found a forced draft oven at temperatures between 130 and 160° C. with a circulating air flow to be satisfactory. Under these conditions, drying generally takes about 10–20 hours.

The dried salt-treated silica gel is then activated to complete its preparation as a desiccant. It is activated at temperatures between about 180 and 250° C. for from 2 to 6 hours. After activation, total volatiles in the gel should be no more than about 6–7%.

There is an alternate method for adding the salts in our process. We have found that the same product can be prepared if the appropriate amount of salt is added to the acid before it is mixed with the alkali metal silicate. For example, using the process we have described, 2 to 6% (based on the weight of the $SiO_2$) of the metal salt is added to the sulfuric acid before mixing the acid with the sodium silicate. All other steps in the process are the same as previously described.

Our invention will be further explained by the following specific but non-limiting examples.

*Example I*

This example describes the preparation of silica gel using a process well known in the prior art. Sodium silicate (7.2% $Na_2O+23.2\%$ $SiO_2$) and sulfuric acid (33.2% $H_2SO_4$) were pumped at 250 ml./min. and 135 ml./min., respectively, through a stainless steel mixing cell with agitation to produce a 15% silica sol with 150% theoretical acid. The reacting solutions were made from high purity chemicals diluted with deionized water. The reactants were delivered to the cell from calibrated separatory funnel reservoirs by pumps.

The silica sol was collected in polyethylene trays, allowed to set to a hydrogel and aged for two hours.

The aged hydrogel was placed in a 3 liter resin kettle and washed at 60° C. with water which was adjusted to pH 3.4 with $H_2SO_4$. Washing was continued until the resistivity of both the inlet and outlet water was 4500 ohm/cm. With the flow rate of the wash water held at about 100 ml./min. the washing period was about 21 hours.

The hydrogel was dried in a forced draft oven at 150° C. and 3 cu. ft./min. air flow for 17 hours. It was then activated by heating at 200° C. for 4 hours.

Analytical tests were performed on the gel with the following results:

Total volatiles, percent _____ 6.5
$H_2O$ adsorption, percent:
    5% relative humidity _____ 5.52
    10% relative humidity _____ 8.53
    20% relative humidity _____ 14.35
    40% relative humidity _____ 26.67
    60% relative humidity _____ 33.78
    80% relative humidity _____ 37.09
Chemical analysis, percent:
    $Na_2O$ _____ 0.008
    $SO_4$ _____ 0.029
Surface properties:
    Surface area (m.$^2$/g.) _____ 691
    Pore volume (cc./g.) _____ 0.37
    Pore diameter (A.) _____ 21

Total volatiles were determined by heating a weighed sample of the gel at 1750° F. for ½ hour and then reweighing.

Chemical analysis was performed using the standard methods for soda and sulfate.

The surface properties were determined by the well known Brunauer-Emmett-Teller technique using nitrogen adsorption.

*Example II*

One method of adding the salts to the silica gel was demonstrated in a run in which the salts were added to the silica sol. In the first step, a silica sol was prepared as described in Example I.

21 grams of $SnCl.5H_2O$ were dissolved in a minimum amount of water (about 50 ml.). This was added to 2000 g. of silica sol with constant agitation. This amounted to 5% $SnCl_4$ addition based on the weight of $SiO_2$ in the sol.

The sol was then collected in trays and allowed to gel. It was washed at 60° C. with water adjusted to 2.5 pH with HCl until the resistivity of both entrance and exit water was 1000 ohm/cm. This took about 21 hours with a washing rate of 100 ml./min.

Results of analytical tests on the salt treated gel and comparative values of regular gel are tabulated below:

|  | Sn salt treated gel | Gel of Example I |
|---|---|---|
| Total Volatiles, Percent | 6.21 | 6.5 |
| Water Adsorption: |  |  |
|   5% Relative Humidity | 5.92 | 5.52 |
|   10% Relative Humidity | 9.24 | 8.53 |
|   20% Relative Humidity | 14.71 | 14.35 |
|   40% Relative Humidity | 23.83 | 26.67 |
|   60% Relative Humidity | 28.30 | 33.78 |
|   80% Relative Humidity | 29.18 | 37.09 |
| Chemical Analysis: |  |  |
|   Percent $Na_2O$ | 0.026 | 0.008 |
|   Percent $SO_4$ | 0.14 | 0.029 |
| Surface Properties: |  |  |
|   Surface Area (m.$^2$/g.) | 559 | 691 |
|   Pore Volume (cc./g.) | 0.32 | 0.37 |
|   Pore Diameter (A.) | 23 | 21 |

These values were determined by the methods described in Example I.

*Example III*

Another run was made in which 5% $SnCl_4$ (based on the weight of silica in the sol) was added to the silica sol before gelling. All procedures and conditions were the same as those described in Example II.

Analytical results determined as described in Example I are tabulated below:

|  | Sn salt treated gel | Gel of Example I |
|---|---|---|
| Total Volatiles, Percent | 6.30 | 6.5 |
| Water Adsorption: |  |  |
|   5% Relative Humidity | 6.29 | 5.52 |
|   10% Relative Humidity | 9.12 | 8.53 |
|   20% Relative Humidity | 14.79 | 14.35 |
|   40% Relative Humidity | 24.09 | 26.67 |
|   60% Relative Humidity | 28.40 | 33.78 |
|   80% Relative Humidity | 30.78 | 37.09 |
| Chemical Analysis: |  |  |
|   Percent $Na_2O$ | 0.022 | 0.008 |
|   Percent $SO_4$ | 0.14 | 0.029 |
| Surface Properties: |  |  |
|   Surface Area (m.$^2$/g.) | 541 | 691 |
|   Pore Volume (cc./g.) | 0.32 | 0.37 |
|   Pore Diameter (A.) | 24 | 21 |

The data in Examples II and III show the improved water adsorption at low relative humidity made possible by our process.

*Example IV*

Another run was made in which aluminum basic acetate was added to the silica sol.

The silica sol was prepared as described in Example I. Before gelling, an aqueous solution of aluminum basic acetate was added to the sol with constant agitation. The salt solution was made by dissolving 15 g. of aluminum basic acetate in a minimum quantity of water. The quantity, added to 2000 g. hydrosol, was equal to 4% $Al_2O(Ac)_4$ based on the $SiO_2$ in the silica sol.

The salt-treated sol was allowed to gel. It was then washed at 60° C. with water adjusted to 3.4 pH with sulfuric acid until the resistivity of both the entrance and exit water was 4500 ohm/cm. This took about 21 hours with a wash rate of 100 ml./min. It was then dried as described in Example I.

Results of analytical tests performed on the product as described in Example I compared with those of the gel of Example I are as follows:

|  | Al salt treated gel | Gel of Example I |
|---|---|---|
| Total Volatiles, percent | 6.35 | 6.5 |
| Water Adsorption: |  |  |
|   5% Relative Humidity | 5.99 | 5.52 |
|   10% Relative Humidity | 9.07 | 8.53 |
|   20% Relative Humidity | 14.39 | 14.35 |
|   40% Relative Humidity | 24.09 | 26.67 |
|   60% Relative Humidity | 28.40 | 33.78 |
|   80% Relative Humidity | 30.78 | 37.09 |
| Chemical Analysis: |  |  |
|   Percent $Na_2O$ | 0.039 | 0.008 |
|   Percent $SO_4$ | 0.05 | 0.029 |
|   Percent $Al_2O_3$ | 0.48 |  |
| Surface Properties: |  |  |
|   Surface Area (m.$^2$/g.) | 587 | 691 |
|   Pore Volume (cc./g.) | 0.43 | 0.37 |
|   Pore Diameter (A.) | 29 | 21 |

*Example V*

In this run, a silica gel containing a zirconium salt was prepared.

Silica sol was prepared as described in Example I. 27 grams of zirconyl chloride octahydrate ($ZrOCl_2.8H_2O$) were dissolved in a minimum amount of water and added to 2000 g. of sol with constant agitation. The amount of salt added was equal to a 5% addition of $ZrOCl_2$ based on the weight of the silica in the sol.

The salt treated sol was gelled and then washed at 60° C. with water adjusted to pH 3.4 with $H_2SO_4$. Washing was continued until the resistivity of both the entrance and exit water was 4500 ohm/cm. This took about 21 hours with a wash rate of 100 ml./min. It was then dried as described in Example I.

Analytical tests were performed as previously described on the product. Results of these tests along with those of the gel of Example I are tabulated below:

|  | Zr salt treated gel | Gel of Example I |
|---|---|---|
| Total Volatiles, percent | 6.34 | 6.5 |
| Water Adsorption: |  |  |
| 5% Relative Humidity | 6.16 | 5.52 |
| 10% Relative Humidity | 9.03 | 8.53 |
| 20% Relative Humidity | 14.42 | 14.35 |
| 40% Relative Humidity | 24.76 | 26.67 |
| 60% Relative Humidity | 30.18 | 33.78 |
| 80% Relative Humidity | 32.62 | 37.09 |
| Chemical Analysis: |  |  |
| Percent $Na_2O$ | 0.026 | 0.008 |
| Percent $SO_4$ | 0.08 | 0.029 |
| Percent $ZrO_2$ | 1.42 |  |
| Percent $P_2O_5$ | 0.54 |  |
| Surface Properties: |  |  |
| Surface Area (m.²/g.) | 644 | 691 |
| Pore Volume (cc./g.) | 0.34 | 0.37 |
| Pore Diameter (A.) | 21 | 21 |

*Example VI*

Another run was made in which titanium tetrachloride was added to the gel preparation.

The standard silica hydrosol was prepared as described in Example I. 15 g. of titanium tetrachloride (liquid) were added to 2000 g. hydrosol with constant agitation. This amount was 5% $TiCl_4$ based on the weight of $SiO_2$ in the sol.

The salt treated sol was allowed to gel as usual. It was then washed at 60° C. with water whose pH was adjusted to 2.7 with HCl until the resistivity of both the entrance and exit water was 2000 ohm/cm. The washing continued for about 21 hours with a wash rate of 100 ml./min.

The gel was then dried and analytical tests performed as described in Example I. Results are tabulated below:

|  | Ti salt treated gel | Gel of Example I |
|---|---|---|
| Total Volatiles, Percent | 6.33 | 6.5 |
| Water Adsorption: |  |  |
| 5% Relative Humidity | 6.30 | 5.52 |
| 10% Relative Humidity | 9.22 | 8.53 |
| 20% Relative Humidity | 14.83 | 14.35 |
| 40% Relative Humidity | 25.26 | 26.67 |
| 60% Relative Humidity | 29.90 | 33.78 |
| 80% Relative Humidity | 33.06 | 37.09 |
| Chemical Analysis: |  |  |
| Percent $Na_2O$ | 0.039 | 0.008 |
| Percent $SO_4$ | 0.24 | 0.029 |
| Percent $TiO_2$ | 2.51 |  |
| Surface Properties: |  |  |
| Surface Area (m.²/g.) | 627 | 691 |
| Pore Volume (cc./g.) | 0.34 | 0.37 |
| Pore Diameter (A.) | 22 | 21 |

The data presented in Examples IV, V and VI show improved adsorption at low relative humidity can be achieved by the use of aluminum, zirconium or titanium salts.

*Example VII*

In this run, the salt treated silica gel was prepared using the alternate procedure for salt addition, i.e., adding the salt to the sulfuric acid.

A quantity of 205 grams of zirconyl chloride octahydrate ($ZrOCl_2 \cdot 8H_2O$) was added to 8000 grams of 33.9% $H_2SO_4$. A silica sol was prepared by pumping the sulfuric acid-salt solution and sodium silicate solution together in the manner described in Example I.

The quantity of zirconyl chloride added to the acid amounted to 5% based on the weight of $SiO_2$ in the sol.

After the sol was prepared it was allowed to set, washed, dried and recovered according to the procedure described in Example I.

Analytical tests were performed on the final product using the methods previously described.

Results of the tests are shown below:

|  | Zr salt treated gel | Gel of Example I |
|---|---|---|
| Total Volatiles, Percent | 6.44 | 6.5 |
| Water Adsorption: |  |  |
| 5% Relative Humidity | 6.41 | 5.52 |
| 10% Relative Humidity | 9.47 | 8.53 |
| 20% Relative Humidity | 15.13 | 14.35 |
| 40% Relative Humidity | 24.11 | 26.67 |
| 60% Relative Humidity | 27.78 | 93.78 |
| 80% Relative Humidity | 30.02 | 37.09 |
| Chemical Analysis: |  |  |
| Percent $Na_2O$ | 0.047 | 0.008 |
| Percent $SO_4$ | 0.17 | 0.029 |
| Percent $ZrO_2$ | 2.2 |  |
| Surface Properties: |  |  |
| Surface Area (m.²/g.) | 629 | 691 |
| Pore Volume (cc./g.) | 0.33 | 0.37 |
| Pore Diameter (A.) | 21 | 21 |

These data show that the alternate process gives a product with improved water adsorption properties at low relative humidities.

We claim:
1. A process for preparing silica gel having a water adsorption capacity of at least 8.5% at 10% relative humidity which comprises preparing a silica hydrosol by the reaction of sodium silicate and sulfuric acid, adding 2 to 6% by weight based on the weight of silica in the sol of a salt of a metal selected from a group consisting of the bromides, chlorides, iodides, sulfates, acetates and nitrates of aluminum, cerium, germanium, lead, thorium, tin, titanium and zirconium which is capable of being hydrolyzed to a hydrous oxide to the sol, allowing the mixture to set to a hydrogel, washing the gel with an acidic wash water having a pH of about 2.5 to 3.5 until the resistivity of the effluent is essentially equal to that of the wash water, at about 60° C., drying the washed gel at about 150° C. for 15–20 hours, activating the dried gel by heating at about 200° C. for 3–6 hours and finally, recovering the product.

2. A process according to claim 1 in which the metal salt is stannic chloride.

3. A process according to claim 1 in which the metal salt is aluminum basic acetate.

4. A process according to claim 1 in which the metal salt is zirconyl chloride.

5. A process according to claim 1 in which the metal salt is titanium tetrachloride.

References Cited by the Examiner

UNITED STATES PATENTS

| 1,584,716 | 5/1926 | Behrman | 252—453 X |
| 1,864,628 | 5/1932 | Barclay | 252—452 |
| 1,879,022 | 9/1932 | Barclay | 252—452 |
| 2,289,919 | 7/1942 | Lee et al. | 252—451 |
| 2,352,416 | 6/1944 | Thomas et al. | 252—451 X |
| 2,377,026 | 5/1945 | Miller | 252—453 X |
| 2,382,239 | 8/1945 | Lee | 252—451 X |
| 2,457,970 | 1/1949 | Bailie | 252—451 X |
| 2,462,798 | 2/1949 | Wilson | 252—451 X |

OSCAR R. VERTIZ, *Primary Examiner.*

M. A. BRINDISI, *Examiner.*

E. J. MEROS, *Assistant Examiner.*